June 11, 1929. N. M. HOPKINS 1,716,777
ALTERNATING CURRENT CONVERTER
Filed March 7, 1922  4 Sheets-Sheet 3
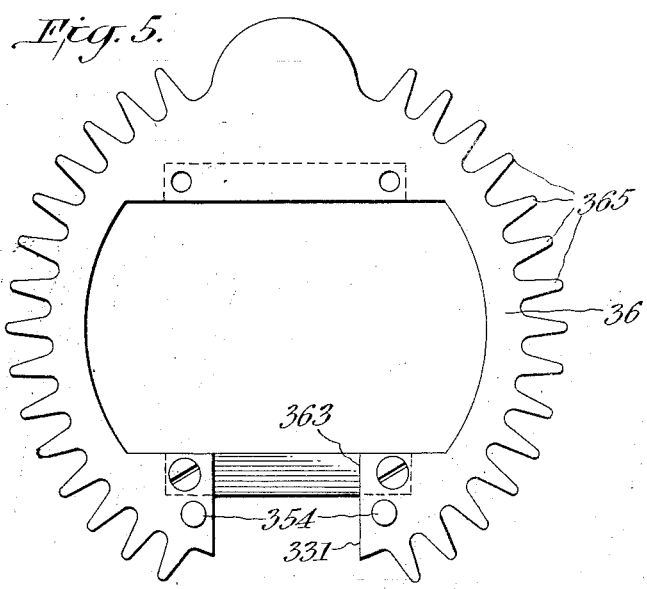
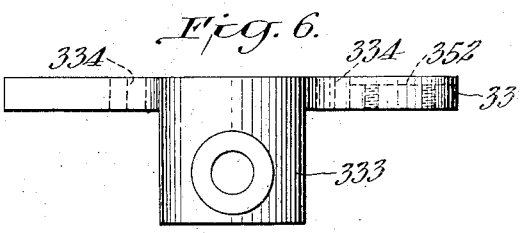
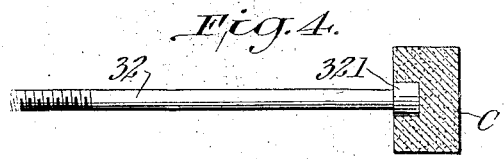

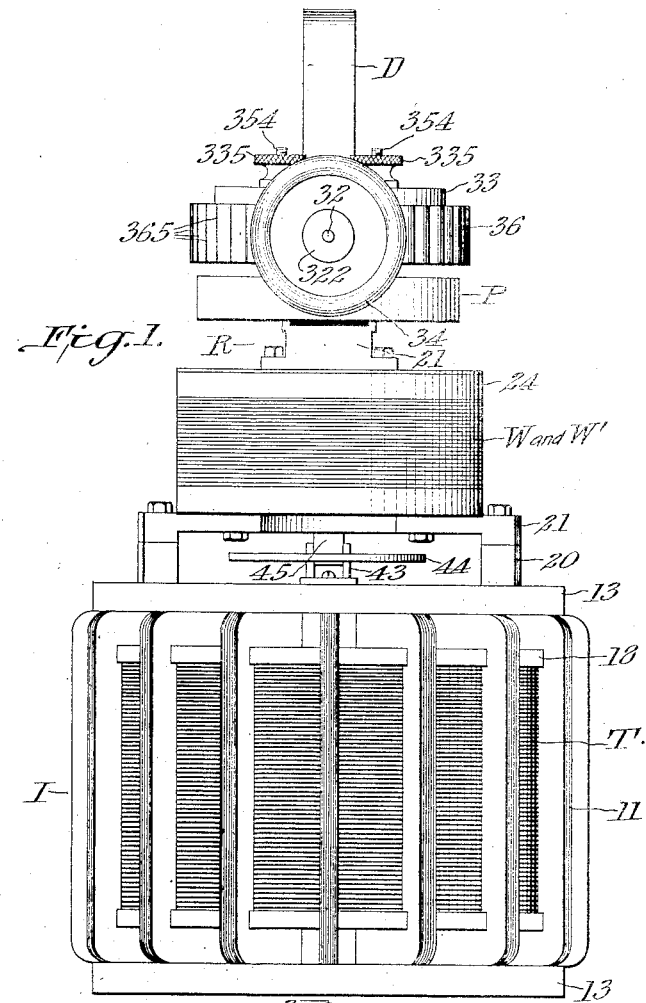
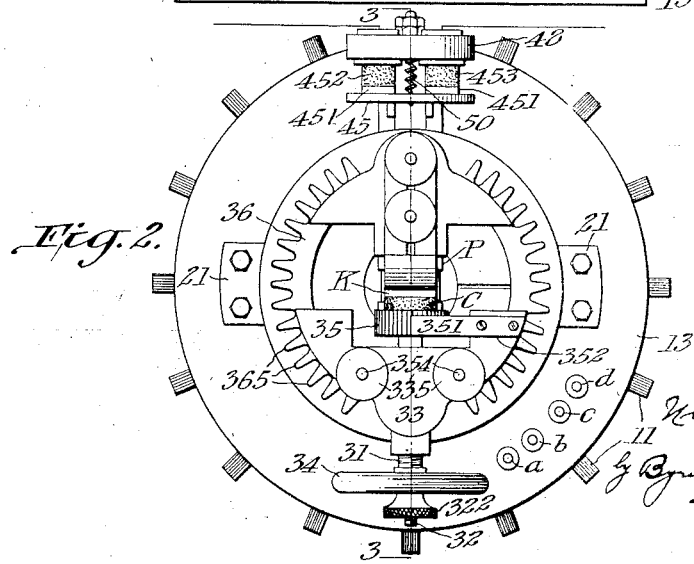

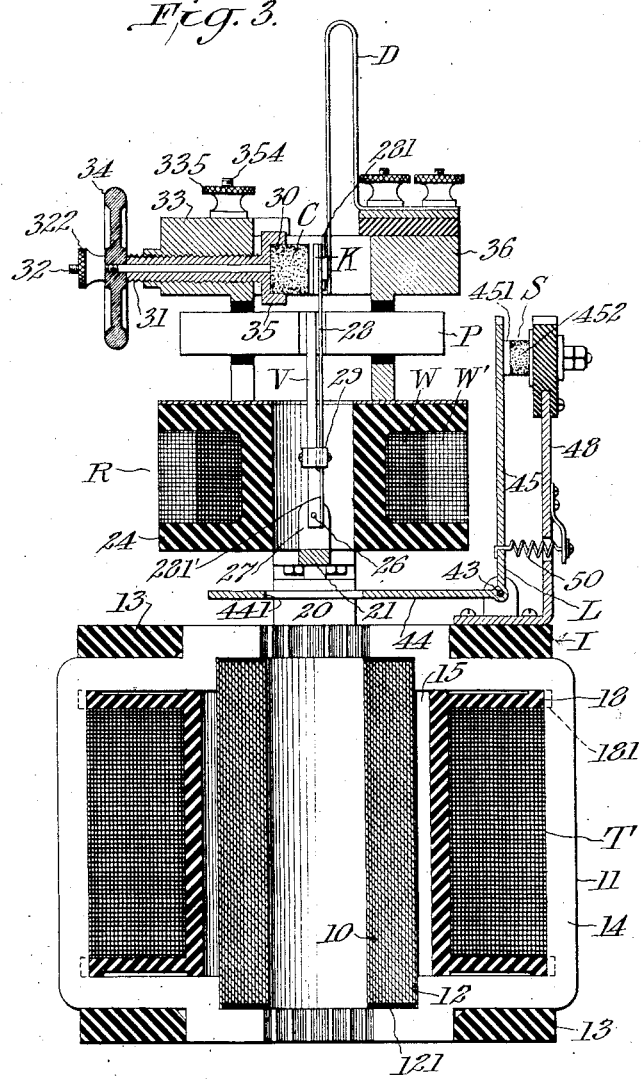

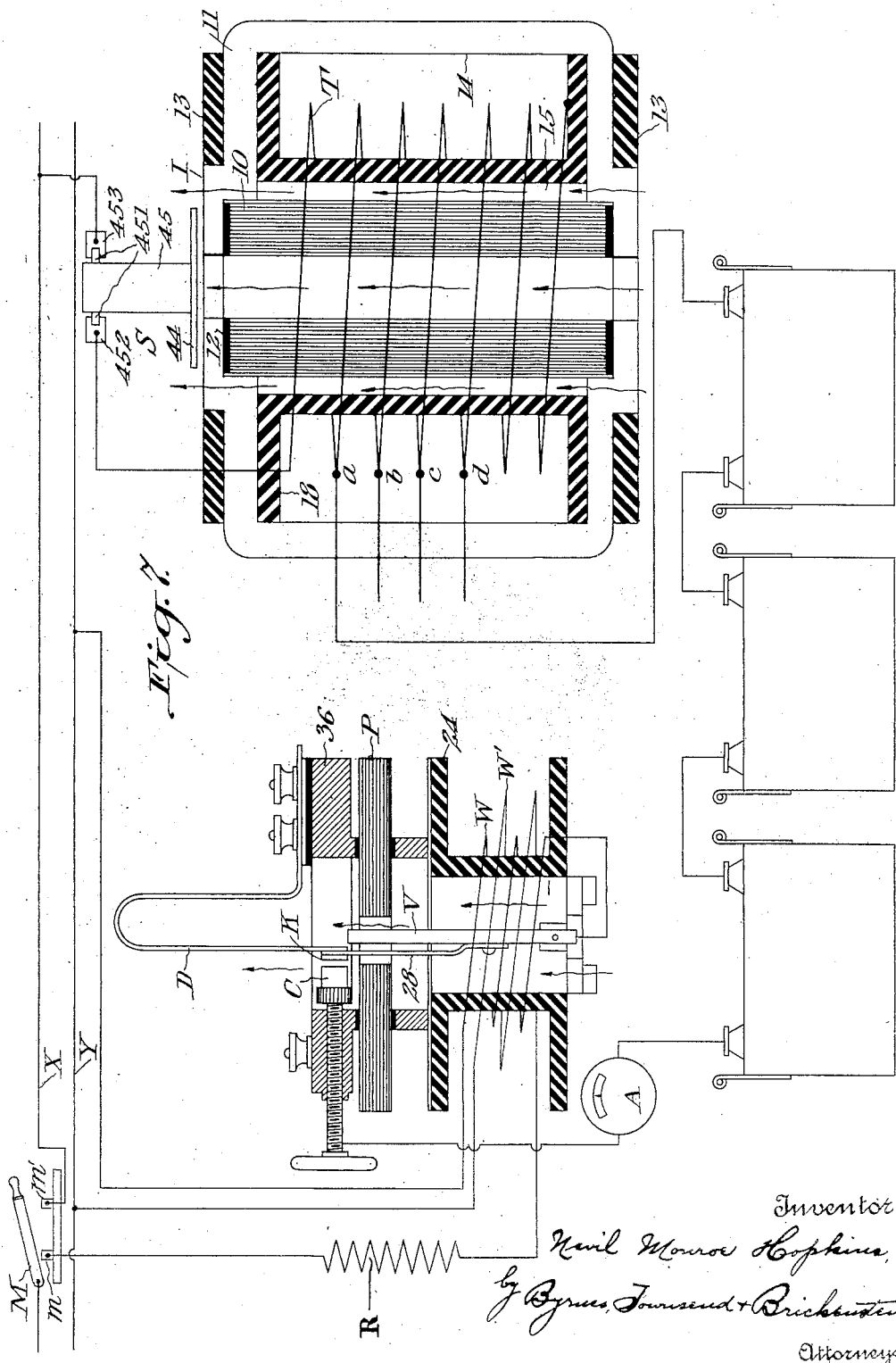

Patented June 11, 1929.

1,716,777

UNITED STATES PATENT OFFICE.

NEVIL MONROE HOPKINS, OF NEW YORK, N. Y., ASSIGNOR, BY MESNE ASSIGNMENTS, TO NATIONAL CARBON COMPANY, INC., OF NEW YORK, N. Y., A CORPORATION OF NEW YORK.

ALTERNATING-CURRENT CONVERTER.

Application filed March 7, 1922. Serial No. 541,813.

This invention relates to alternating current converters of a type embodying a rectifier and current and potential altering means adapted to render alternating current of from 110 to 220 volts suitable for supplying direct current to electrical apparatus, as in charging storage batteries.

Vibratory rectifiers heretofore employed in such apparatus have given more or less trouble because of destructive arcing at the rectifier contacts, caused generally by spawled off particles of the contacts lodging therebetween and short-circuiting them. Such converters have also generally been designed for use on but a single voltage, and the heat developed during operation has not been satisfactorily dissipated to avoid overheating the contacts and injuring the windings.

The principal objects of the invention are therefore to provide improved potential altering and rectifying means in which short-circuits between the rectifier contacts shall be promptly interrupted to avoid sustained arcing and destruction of the rectifier contacts; to provide means for more readily dissipating the heat developed at the contacts of the rectifier and in the several windings and cores of the apparatus; and to provide a current converter which may be coupled to supply circuits having a wide range of voltages and one that is especially adapted for use in charging storage batteries, arranged so that one or more storage batteries may be charged, as desired, without complicated adjustments of the rectifier or other parts of the apparatus.

Generally speaking, the above and other objects and advantages are attained by providing a quick acting automatic switch to interrupt the supply circuit to the rectifier when a short circuit occurs at the rectifier contacts and to restore the current supply when the cause of the short circuit is removed; by providing improved rectifier contacts and supporting means therefor; by providing ample cooling means for such contacts and the vibrating means associated therewith; and by providing a variable impedance having taps whereby the voltage of the charging circuit may be changed to charge one or several storage batteries as desired.

The above and other objects and the novel features of the invention will be apparent from the following description taken with the drawing, in which, Figure 1 is a side elevation of one type of improved electric current converter embodying the present invention; Figure 2 is a top plan view of the same; Figure 3 is a vertical sectional view of the same, taken on the line of 3—3 of Figure 2; Figures 4, 5 and 6 are detail views of the construction of the stationary contact and its supporting means; and Figure 7 is a diagram of the wiring of the apparatus.

As illustrated, one advantageous embodiment of the invention comprises a variable impedance I that has a winding T, one terminal of which may be connected to an alternating current supply main and which may be provided with a number of taps $a$, $b$, $c$ and $d$, any one of which may be connected to the delivery circuit of the converter depending upon the amperage and voltage desired or the number of storage batteries to be charged therefrom. The rectifying device, which may be of any suitable type, is associated with the impedance coil I and herein comprises a vibrator rectifier R, the vibrator V of which vibrates in synchronism with the alternating current supply circuit and carries the contact K that cooperates with the contact C to open and close the supply circuit to rectify one half of each wave of the alternating current. Other types of rectifiers may be employed. The actuating means for the vibrator V comprises a winding W in series with the alternating current supply circuit and arranged to alternately induce poles of opposite polarity at the ends of the iron or steel vibrator which has a free movable end extending between the poles of a permanent magnet P.

The rectifier also has a winding W' that is connected in series with a resistance R and through a switch across the alternating current supply mains X, Y so as to alternately induce north and south poles in the vibrator V and initiate the vibration of the latter. The opposed permanent north and south poles of the magnet P alternately attract and repel the free end of the vibrator V as its polarity alternates and thus close the delivery circuit at the contacts C, K during each alternate half wave of the alternating current. After the winding W' has started the operation of the vibrator, the winding W cooperates therewith to continue such vibration.

During the operation of the rectifier, there are times when injurious arcing occurs at the contacts C and K, as when particles spawl off and lodge between the contacts, thereby maintaining a circuit between the contacts. Under such conditions the fuses in the supply circuit to the rectifier will ordinarily blow and interrupt the functioning of the rectifier until the fuses are replaced. Furthermore, such arcing injuriously affects the contacts and in most cases if the arcing continues too long the contacts must also be replaced, all of which detracts from the utility of the rectifier, adds to the expense involved in renewing such contacts and the time lost in its use. Accordingly, an automatically acting switch S is provided which is designed to quickly open the supply circuit of the rectifier to interrupt the arcing and to permit the contacts C and K to separate and the particles therebetween to become dislodged. The switch S is also designed to promptly reclose the supply circuit so that the rectifier will be again set in operation after the cause of the short circuit is removed. The switch S is operated automatically by the change in the value of the magnetic flux set up in the variable impedance by the short circuit, and when the latter is removed, the flux conditions in the impedance becomes normal and the automatic switch recloses the circuit to permit the continuation of the rectifying operation.

The variable impedance may be of any desired construction and as herein illustrated comprises a central hollow laminated iron core 10, formed of a thin strip of suitable magnetic metal substantially in the manner shown and described in application Ser. No. 446,126, filed in my name on Feb. 18, 1921, now Patent No. 1,623,345 dated April 5, 1927. The core of the impedance comprises a circular series of U-shaped yoke plates 11, the ends of which are notched as at 12 to fit the opposite ends of the cylindrical core leg 10, the latter being shortened within the outer turn thereof, as at 121, so that the turns of the core strip will not be magnetically short circuited by the ends of the yoke plates. The yoke plates 11 may be entirely of magnetizable metal or both magnetizable and non-magnetizable metal, and provide metal paths for the magnetic flux induced by the winding T and also serve as heat-radiating fins for dissipating the heat developed in the impedance. The yoke plates 11 may be clamped into position on the core leg 10 by the end rings 13, and extend radially from the outer side of the central core leg 10, having intermediate portions 14 which are spaced from the outer surface of the core leg 10 to provide a space to receive the winding T, which is desirably so arranged that its internal diameter is larger than the external diameter of the core leg 10 to leave an annular space 15 around the outside of the latter so that air may circulate along the outside as well as the inside of the core leg 10 and carry off heat developed therein. The winding is desirably wound on a spool 18 of insulation, which is disposed in the space within the yokes 11, said spool having notches 181 in its flanges to receive the yokes edgewise and an internal diameter that is larger than the outside diameter of the core leg 10 to leave the air space 15. The end rings 13 may be secured to the flanges of the spool 18 and the taps $a$, $b$, $c$ and $d$ of the winding T may be connected to the binding posts as illustrated so that they will be accessible for the connection thereto of wires leading to storage batteries to be recharged.

The rectifier proper may be mounted beside the impedance or, as illustrated, upon the impedance I, posts 20 being provided on the upper ring 13, upon which the base plate 21 may be secured to provide a space between the rectifier head and the impedance to receive a part of the automatic switch which depends for its operation on changes of the value of the flux in the variable impedance. The base plate 21 supports the windings W and W' which are desirably wound on a spool 24 secured to the base plate 21 and having a central passage that is coaxial with the two passages through and around the central core leg 10. The vibrator V is disposed within the spool 24 and in the axis of the windings W and W', and at its lower end is pivoted at 26 in lugs 27 on the base 21. The vibrator V may be of steel or other magnetizable metal and its upper free end extends between the north and south poles of a permanent magnet P that is supported on the upper side of the spool 24. The vibrator carries the contact K which is desirably a disc of copper or other suitable metal secured by a tapered pin 281 to the upper free end of a leaf spring 28 having its free end secured to an offset portion 281' near the lower end of the vibrator V, thereby separating the free ends of the spring and vibrator. To render the vibrator spring responsive to various alternating current frequencies a clip 29 may be provided, that is adjustable along the vibrator and spring to change the period of the latter. Normally the vibrator is disposed so that the contact K is separated from the stationary contact C with which it cooperates and the spring 28 to provide a quick break when the vibrator operates to open the contacts.

The stationary contact C, as shown, is comparatively massive and desirably consists of a cylindrical block of carbon that is press fitted in a cylindrical cup member 30 carried at the end of an adjusting screw 31. The screw 31 is adjustably fitted in a mounting member 33 of brass or other non-magnetizable metal and a wheel 34 is provided for adjusting the screw 31 and the carbon contact C relative to the contact K. The periphery of the cup member 30 has ratchet teeth 35 which are engageable by a spring detent 351 to retain the screw 31 and the contact C in their adjusted positions but enabling the screw to be readily turned in either direction at will. A removing pin 32 extends through the adjusting screw 31 and has a head 321 at its inner end that seats in the bottom of the cup 30 and in a corresponding recess in the contact C. The pin 32 is threaded at its outer end to receive a thumb-nut 322 whereby the pin 32, wheel 34 and screw 31 are detachably secured together on the mounting 33. Upon removal of the nut 322, the pin 32 may be driven out so as to force the carbon contact C out of the cup 30 to permit replacing it. The head 321 on the rod 32 has a press fit in the corresponding recess in the contact C so that the latter is held tight regardless of the expansion of the cup 30 and prevented from vibrating within its holder at all working temperatures. The mounting 33 is removably fitted in a recess 331 of the massive heat dissipating block or member 36, the members 33 and 36 having interfitting tongue and groove means 333 and 363 to connect the members, and the member 36 having threaded pins 354 secured thereto adapted to pass through holes 334 in the member 33 and arranged to receive thumb-nuts 335 whereby the mounting member with the carbon contact and its adjusting means are arranged so that they may be readily removed as a unit from the supporting block 36. The block 36 may be mounted on the permanent magnet P, as shown, and may have heat radiating fins 365. The spring detent 351 may be secured in a recess 352 in the mounting 33. Both the permanent magnet P and the block 36 have passages therethrough to permit the free circulation of air, thereby cooling the impedance I, the windings W and W', and the contacts C and K.

As a further aid to the dissipation of heat from the vibrating contact K, means may be provided for physically engaging the contact supporting means so that the heating of the contact caused by unavoidable arcing at the contacts will be dissipated therefrom by direct conduction. For this purpose, a member D of large heat radiating surface may be arranged so as to engage the contact supporting spring 28 to conduct heat therefrom. As illustrated, the heat dissipating member D comprises a strip of resilient metal which has one end secured to but insulated from the upper side of the massive heat dissipating member 36, and is bent upwardly and then downwardly so that its free end engages the rear side of the spring 28 adjacent to the contact K, when the vibrator V is at one end of its movement. The spring D thus provides a resilient abutment for the vibrator, as well as a means for keeping the copper contact below a rapid vaporization temperature.

During the operation of the rectifier small particles of carbon contact C spawl off and sometimes lodge in the space between the contacts C and K, short circuiting the alternating current supply circuit and causing injurious arcing at the said contacts. To overcome the objectionable features of such short circuiting and arcing, a quick automatically acting means has been provided for interrupting the supply of current to the rectifier during such injurious arcing and for automatically reclosing the supply circuit when such arcing has ceased. The operation of the automatically acting means is effected by conditions arising within the converter during the short circuit or excessive arcing at the contacts C and K. The excessive flow of current through impedance winding T greatly increases the magnetic flux or the inductance in the core of the impedance which is accordingly employed as the actuating means for operating an electric switch controlling the supply of current to the rectifier. The magnetic switch may take various forms, and as herein illustrated in Figures 1, 2 and 3 consists of an electro-magnetic switch S which has a double-arm lever pivoted at 43, one arm 44 of which projects into the space between the upper end of the core leg 10 and the base plate 21 where it is disposed in the electro-magnetic field of the core of the impedance I. The arm 44 may be provided with an opening 441 in line with the central opening through the core leg 10 so that this arm will not interfere with the circulation of air through the apparatus. The other arm 45 of the switch lever extends upwardly and carries a pair of electrical switch contacts 451 near its upper end which cooperate with a pair of carbon switch contacts 452 and 453 mounted on and insulated from a bracket 48 supported on the upper end ring 13. Suitable binding posts are provided for connecting the alternating current line to one of the switch contacts 452 and for connecting the other switch contact 453 to the winding T. The switch is accordingly a single pole double break switch which opens one side of the line when the magnetism of the impedance core is sufficiently strong to attract the arm 44. A short circuit at the rectifier contacts causes a magnetic supersaturation of the core 10 producing sufficient magnetism to pull the switch arm 44 downwardly to open the switch contacts in series with the supply main leading to the winding T. During this interruption of the circuit the winding W' of the rectifier continues to polarize the vibrator V, the latter vibrating and thereby dislodging any particle caught between the contacts. After the short circuit is removed, the magnetic condition of the core restores to normal, the switch recloses the supply circuit and the rectifier resumes operation. Normally a spring 50, having one end secured to a bracket 48 and the other end secured to the arm 45, holds the switch in a closed position, and will restore the switch to closed position after the interruption of a short circuit. A single line switch M having blades $m$ and $m'$ is arranged to successively close the main line circuit to the shunt coil W' and to the load line X, Y. Accordingly, the apparatus is self-starting, and always starts off with the same polarity, and when the switch M is opened the battery will be prevented from discharging back through the apparatus. A suitable ammeter may be connected in the charging circuit and the apparatus may be enclosed in a suitable protective portable casing.

The operation of the improved converter will be apparent from the foregoing description. While the apparatus illustrated only rectifies alternate half waves of the alternating current, it will be understood that the principles disclosed may also be employed in apparatus which rectifies successive half waves. The improved apparatus may be employed on alternating current mains of 110 or 220 volts of various frequencies to economically charge from one to six six-volt storage batteries or three twelve-volt batteries in series at a five ampere rate. The rectifier contacts are the only elements which deteriorate to any extent and may readily be renewed at small expense. It will be understood that the construction of the improved converter may be modified without departing from the principles of the invention, which is accordingly not limited to the details disclosed.

I claim:

1. The combination with an electrical rectifier comprising cooperating contacts and means for starting the operation of one of said contacts before the closure of the circuit including said contacts, and means whereby the circuit including said contacts is automatically opened when a short circuit occurs and whereby said circuit is reclosed upon removal of such short circuit, such starting means being adapted to continue the operation of said one contact during the interruption of the circuit through said contacts.

2. The combination with an electrical rectifier having cooperating contacts, a magnetizable core, a winding on said core in circuit with said contacts, and an electromagnetic switch controlling the circuit of said contacts and winding and having an operating member adapted to be attracted by said core to open said switch when a short circuit occurs between said contacts and a spring for reclosing said switch when such short circuit has been removed.

3. An electrical rectifier comprising a stationary contact, a vibrating contact cooperating therewith, and a yieldable member engageable by said vibrating contact to conduct heat therefrom and constituting an abutment for said vibrating contact.

4. The combination of an electrical rectifier having a magnetizing winding and a vibrator disposed in the axis of said winding and in circuit therewith, a potential altering device having a winding coaxial with said magnetizing winding and in circuit with the latter but spaced therefrom, and means extending into the space between said windings and operable to interrupt the flow of current therethrough.

5. Electrical apparatus comprising a substantially annular support, a movable contact within said support, a stationary contact cooperating therewith, a mounting for the latter, means on said mounting whereby said stationary contact may be adjusted relatively to said movable contact, and means whereby said mounting is removably secured to said support.

6. Electrical apparatus comprising a contact, an adjustable holder therefor having a recess receiving said contact, and removable means in said recess to which said contact is secured and operable to force said contact from said holder.

7. Electrical apparatus comprising a contact, an adjustable holder therefor having a recess receiving said contact and a passage communicating with said recess, and a removable rod projecting through said passage into said recess and secured to said contact substantially normal to the contacting face of the latter whereby said contact may be forced from said holder by the removal of said rod.

8. Electrical apparatus comprising a contact of carbon, an adjustable holder therefor having a recess in which said contact fits tightly, and a removable member in said recess onto which said contact is tightly fitted and whereby said contact may be forced from said holder.

9. Electrical apparatus comprising a contact, a mounting, an adjustable holder on said mounting having a recess receiving said contact, said holder having a passage therethrough communicating with said recess, a removable rod projecting through said passage and secured to the rear side of said contact, a handle for adjusting said holder, and means for securing together said rod, handle and holder.

10. An electrical rectifier comprising an operating winding, a starting winding, a vibrator disposed in the coincident axes of said windings and in circuit with said operating winding, an adjustable stationary contact, and a contact carried by said vibrator cooperating with said stationary contact.

11. An electrical rectifier comprising a spool, an operating winding on said spool, a vibrator disposed substantially in the axis of said spool, a polarizing magnet mounted on said spool and arranged to cooperate with said vibrator, a massive heat-dissipating member mounted on said polarizing magnet, an adjustable stationary contact mounted on said heat-dissipating member, a contact yieldably mounted on said vibrator and cooperating with said stationary contact, and a resilient heat-dissipating abutment for the vibrator contact.

In testimony whereof, I affix my signature.

NEVIL MONROE HOPKINS.